(12) United States Patent
Krylov et al.

(10) Patent No.: US 8,156,117 B2
(45) Date of Patent: Apr. 10, 2012

(54) METHOD AND SYSTEM FOR STORING, SEARCHING AND RETRIEVING INFORMATION BASED ON SEMISTRUCTURED AND DE-CENTRALIZED DATA SETS

(75) Inventors: Vladimir Vladimirovich Krylov, Novgorod (RU); Dmitry Maximovich Ponomarev, Novgorod (RU)

(73) Assignee: Obschestvo S Ogranichennoi Otvetstvennostiyu "Meralabs", Nizhny Novgorod (RU)

( * ) Notice: Subject to any disclaimer, the term of this patent is extended or adjusted under 35 U.S.C. 154(b) by 150 days.

(21) Appl. No.: 12/676,216

(22) PCT Filed: Sep. 3, 2007

(86) PCT No.: PCT/RU2007/000475
§ 371 (c)(1),
(2), (4) Date: May 11, 2010

(87) PCT Pub. No.: WO2009/031915
PCT Pub. Date: Mar. 12, 2009

(65) Prior Publication Data
US 2010/0223262 A1 Sep. 2, 2010

(51) Int. Cl.
*G06F 17/30* (2006.01)
(52) U.S. Cl. .................................. 707/728; 707/770
(58) Field of Classification Search ............. 707/728
See application file for complete search history.

(56) References Cited

U.S. PATENT DOCUMENTS

| | | | |
|---|---|---|---|
| 6,493,706 B1 * | 12/2002 | Mead et al. | 1/1 |
| 6,704,729 B1 * | 3/2004 | Klein et al. | 1/1 |
| 6,877,148 B1 | 4/2005 | Hassibi et al. | |
| 6,917,983 B1 | 7/2005 | Li | |
| 6,944,654 B1 * | 9/2005 | Murphy et al. | 709/223 |
| 7,444,355 B1 * | 10/2008 | Clark et al. | 1/1 |
| 2002/0156788 A1 | 10/2002 | Heh | |
| 2003/0154197 A1 | 8/2003 | Millet et al. | |
| 2003/0204497 A1 | 10/2003 | Kalogeraki et al. | |
| 2006/0101320 A1 * | 5/2006 | Dodds et al. | 715/500 |
| 2006/0242155 A1 * | 10/2006 | Moore et al. | 707/10 |

FOREIGN PATENT DOCUMENTS

| | | |
|---|---|---|
| RU | 2240596 | 11/2004 |
| WO | 0113273 | 2/2001 |

\* cited by examiner

*Primary Examiner* — Don Wong
*Assistant Examiner* — Binh V Ho
(74) *Attorney, Agent, or Firm* — Fitch, Even, Tabin & Flannery, LLP

(57) ABSTRACT

A system for storage and methods for search and retrieval of information presentable as a plurality of tree-structured information objects of an arbitrary application domain are disclosed. The system comprises a distributed computer system consisting of computing devices, interconnected with each other by physical communication lines, and a connected logical storage network, every node of which is an active unit of storage (AUS), incorporating an information object, a program agent and a list of links of said AUS to a plurality of other AUS on the network, wherein the links form connections among the nodes of the logical storage network. Links of an AUS pointing at a plurality of other AUS are created based on a metric calculated taking into account the intrinsic structure of stored and retrieved information objects, and enabling determination and use of the degree of relevance between search information attributes and respective attributes of a search query. Methods for storing and retrieving information in the disclosed system are provided. The system and methods enable efficient storage, searching and retrieving information.

60 Claims, 4 Drawing Sheets

METHOD AND SYSTEM FOR STORING, SEARCHING AND RETRIEVING INFORMATION BASED ON SEMISTRUCTURED AND DE-CENTRALIZED DATA SETS

BACKGROUND

1. Field of the Invention

The invention relates to a system of storage and methods for searching and retrieving information presentable as a plurality of information entities.

2. Related Art

For many years in computer technologies information storage systems also referred to as database management systems (DBMS) arouse great interest. There are two most widespread classes of storage systems that encompass the majority of currently existing DBMS.

The so-called relational DBMS constitute the first, vastest and most popular class of such systems. The vast number of inventions done by the present date is related in one or another way to relational databases.

By way of example, US patent 20030154197 titled "Flexible relational data storage method and apparatus" describes a method and system for creating a flexible database application allowing users to add, update and remove data columns and, optionally, the displayable data field attributes of such columns within a table of a relational database. A collection of data records is stored in four or more special tables as a set of data. Such table structure gives user computers greater flexibility of access to the DBMS server and provides for data control over a computer network.

Systems for storing data in form of structured XML documents having a wide distribution also rely on relational principles. For example, US patent 20060101320 titled "System and method for the storage, indexing and retrieval of XML documents using relational databases" discloses a method and system for storage, search and retrieval of XML documents within already existing relational databases. The essence of the method consists in transforming structured XML documents so that they become suitable for storing in conventional relational databases. During such transformation XML documents are "disassembled" and reduced to constituent elements and each such element (an XML document node) is assigned several metadata attributes describing the name of the element, the data it contains and the path leading from the XML-document root to this node. Every such element is then stored in one or several data columns of a relational database.

Retrieval of stored XML documents consists in transforming queries in Xpath and/or XQuery languages to an SQL queries to the relational database. Generated search results undergo the reverse process for restoring required XML documents from them.

It is pertinent to note that all methods and systems based on relational principles of data storage have common weaknesses. A practical implementation of the invention disclosed herein allows overcoming a number of serious limitations intrinsic to the relational approach:

The known technical solutions describe a single center of control over all processes pertaining to data storage.

Decentralization is necessary that would allow distribution of the computing resources and capacity of computer systems required for data storage and processing among all nodes of the repository (and all computer platforms the repository is deployed on.) Such approach, firstly, allows to obtain a greater stability and fail-safety of the storage system owing to lack of the single node, the failure of which entails non-operability of the whole system (the so-called a single point of failure) and owing to wide possibilities for backing up data stored in a peer-to-peer network of storage devices, and, secondly, decentralization provides virtually unlimited capability of scaling the repository storage memory resources, the quantity of stored data objects, and a huge potential of scaling in terms of the amount of search queries that the system can handle in a unit time (that is in terms of querying rate.)

The relational approach to storage involves distribution of information objects data among a plurality of interrelated tables in accordance with a pre-designed relational structure, at the same time, during processing of retrieval queries it is often necessary to assemble the sought data object from a plurality of records in various tables, which in case of a vast and heavily ramified relational structure and great volume of stored data results in a significant drop in the rate of processing such retrieval queries.

A different approach is needed in which all information about any object is concentrated at a single point, in a single data object, and a user's query returns the entire object at once. In this case the resource intensity of retrieval procedures may be significantly lowered (for example, it may become proportional to logarithm of the number of stored objects.)

In case of a relational database, hardware configuration of a storage server should be pre-determined at the stage of designing the database, and cannot be changed afterwards. If the database becomes oversized and querying rate grows beyond the computing power and channel capacity of a physical server, an extension of computing resources or addition of new servers to the system require complete shutdown of the database and probably a revision of its relational data model, optimization of distribution of the relational structure among physical storage devices and subsequent restart. It is obvious that all these procedures involve considerable additional expenses.

There is necessity in a solution that could resolve the problem of a physical server overload by simple addition of one or several computers to a network thus enabling further database scaling. In other words, a system capable of automatic scaling for matching the augment of physical resources is necessary.

Distributed or peer-to-peer DBMS make another widespread class of data storage systems. Data in such systems are stored not in a centralized manner on separate specialized devices, i.e. data storage servers, but rather in a plurality of nodes of a peer-to-peer network containing storage devices provided with special software. Namely to this class of database systems the method for data storage disclosed in this invention pertains.

The majority of methods for data storage in decentralized DBMS use a hash value mechanism for retrieval of stored data. For example, in US patent 20060242155, titled "Systems and methods for providing distributed, decentralized data storage and retrieval", a method and system for distributed and decentralized data storage and retrieval are disclosed. In the mentioned solution, data is represented as bit streams of multimedia information. Every bit stream is divided into individual fragments that are stored in the nodes of a peer-to-peer network of a decentralized storage system.

Every node maintains a local routing table with information about one or several neighbors. At least one of local routing tables comprises data about a hash basing on which a node address to which the bit stream for storage should be forwarded can be determined.

The use of hash values in storage and retrieval of data in distributed DBMS imposes some limitations on the flexibility of search querying in such databases. For example, only an exact match search is possible where the search query matches exactly the data attributes addressable by hash codes. If query data differs even in one bit from attributes of sought objects, such objects will not be found despite their relevance to the query.

A solution is needed that could obviate this shortcoming and make search more flexible.

Besides, the basis for methods of estimating response relevance to a query in modern search engines is coincidence of keywords of requested data with words of the queries. In this case, multiple possible representations of keywords determined by gender, case, number inflexions etc. should be taken into account and no account is taken of the degree of similarity between intrinsic structure of a query mask and sought information objects. Therefore, search methods allowing for ordered keywords in the query are essential.

SUMMARY OF INVENTION

This invention provides a method for storing information in form of a semi-structured and decentralized set of active units of storage with a system of logical connections between them and a method for search and retrieval of information from the set obtained in this fashion. The proposed solution allows overcoming the aforementioned limitations of solutions known from prior art.

Since the data search and retrieval method provided in accordance with this invention employ not hash values but a specially designed metric taking into account the specifics of the intrinsic structure of stored data objects and allowing the determination of the degree of similarity between sought attributes and respective attributes of queries, the so-called fuzzy search becomes possible. A fuzzy search returns information objects semantically similar to the search query and not necessarily exactly matching it at the same time. The objects returned in the process demonstrate a varying degree of relevance to the search query.

Generation of active units of storage (AUSs) comprises two steps. During a first step an informational description being an information object (IO) having a tree-like intrinsic structure is created for any object (entity) of an arbitrary application domain to be stored, in accordance with this invention.

Said information object is assigned a unique identifier that becomes the uniform resource identifier (URI) for the active unit of storage that incorporates this information object. Later, said URI serves as the address of this active unit of storage during search and retrieval of information from a decentralized repository.

After an information object has been generated and embedded into the AUS being built a second step of its formation starts. During the second step a specialized agent which is a set of program modules is added to the active unit of storage. The program agent allows the AUS to collect and maintain information about connections to other active units of storage as well as to search the decentralized repository for information objects relevant to search queries.

Thus, a newly generated active unit of storage comprises an information object with a description of the stored information entity and a program agent performing a number of functions that ensure attainability of the information object by search queries and enable search of other active units of storage.

The method of adding an active unit of storage to a decentralized repository consists in generating for the newly added AUS logical connections to a plurality of other AUSs already stored in the repository and selected in accordance with a certain algorithm. The resulting plurality of interlinked storage units represents a so-called peer-to-peer logical storage network.

In parallel with the logical network there is also a physical peer-to-peer network formed by storage systems, in the memory of which all active units of storage reside. Hence, the logical storage network is an overlay network built over the physical network. This provides complete independence of these two networks in the decentralized repository, since physical placement of information objects in storage systems in general is independent on logical connections between them. At the same time, in some embodiments of the invention such dependence may be implemented for the sake of optimization.

Removal of an active unit of storage is performed in accordance with a specially designed algorithm that guarantees the retention of integrity of the logical peer-to-peer network.

Generation of logical bindings between individual active units of storage is performed in accordance with the degree of information similarity of IOs included in AUS data. The more similar to each other said information objects the greater is the probability that AUSs comprising them will generate logical connections there between.

The degree of similarity between information objects is determined by a metric calculated according to an algorithm which is a part of this invention.

Information search is enabled through generation, based on a search query, of a special query information object, also called search mask, and subsequent search across the logical storage network for AUSs containing information objects that are most relevant to said mask.

The method for searching active units of storage containing relevant IOs consists in a successive advance of a current search point from AUS to AUS across the logical storage network and determining a metric of information similarity between the search mask and information objects incorporated into the active units of storage in question at every step of this advance.

The advance of the current search point from AUS to AUS across the logical network is performed on logical connections presenting between them.

The current search point moves in the direction of increasing information similarity between the search mask and currently evaluated information objects or, which is the same, in the direction of decreasing metric distance between the mask and IO.

One of the technical results, accomplished by the invention, is a new method of storing information in form of a semi-structured and decentralized plurality of active units of storage producing a peer-to-peer network of logical connections possessing a potentially limitless storage capacity scalability (where actual scalability limits are dictated by hardware only) and a new method of information search in such logical storage network.

DETAILED DESCRIPTION

Figure 1:
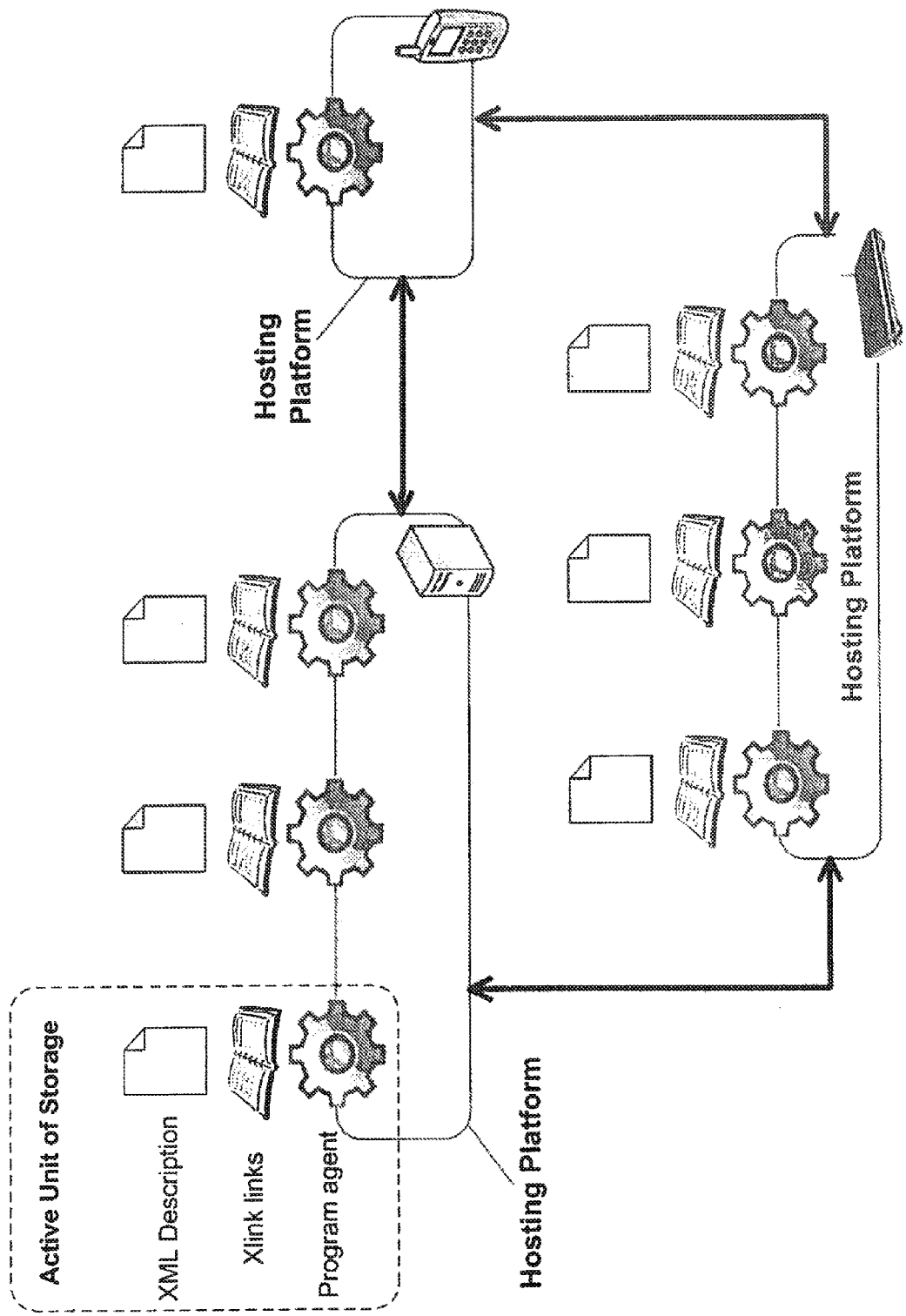
FIG. 1 illustrates the intrinsic structure of an active unit of storage and principle of physically deploying a repository of AUSs on hosting platforms of various computing devices.

In accordance with this invention information to be stored is represented as a plurality of so-called active units of storage (AUSs). For every information entity (data object) to be stored an unique active unit of storage is generated that provides full representation of the respective information entity in the repository and allows search and retrieval of data that constitute said information entity. FIG. 1 depicts the intrinsic structure of an AUS.

Generation of active units of storage comprises two steps. During a first step, an informational description hereinafter referred to as "information object" (IO) is created for any entity (object) of an arbitrary application domain. The created information object becomes a constituent part of the active unit of storage (FIG. 1)

An IO may include any data about the entity it describes in context of the application domain, to which the description pertains.

A repository may store information objects that describe information entities from different application domains, and all active units of storage comprising said various IO will also form a logical network of connections between them.

For example, if the intended application domain for the suggested method is storage of information about product units, the information object that describes an individual product unit may include the electronic product code (EPC) of the product, information about the product manufacturer, the category, to which the product unit belongs, the date of manufacture, service life, current location etc. The EPC in such case serves as a key that binds the information object with the product unit. One of embodiments of such binding is inclusion of the EPC in the radio-frequency identification (RFID) tag applied to the product unit. The EPC may be read then by a RFID reader and forwarded to created according to the present invention a data repository in which searching an information object corresponding to the product unit is performed. Search based on inverse criterion is also possible, wherein the product informational description including the EPC is retrieved based on the given product unit characteristics.

By way of another example, if the application domain is the so-called "Internet of Things", a globally distributed multiplicity of electronic devices interacting with each other over a world-wide communication infrastructure comprised of the Internet and cellular networks, and entities subject to description are all electronic devices belonging to the multiplicity Internet of Things, then information objects that describe these devices may include data about services provided by the devices, their addressing methods, interoperation protocols etc. The use of the provided method in this case promises many benefits, for instance, a solution of the problem of global detecting electronic devices on the whole Internet. This, in turn, would allow all electronic devices automatically (without a human involvement) find each other, negotiate ways of interaction and dynamically cooperate in accomplishment of common goals.

In accordance with this invention the intrinsic structure of information objects is presented in a special tree-like form. Types of data elements and their positioning relative to each other within the structure are defined by special notations (data schemas) domain-specific for every application. By way of example, the type of notations used in property inventory systems will differ from notations typical of commodities exchange systems while the notations employed in home management systems will be entirely different from the previous two.

In practical embodiments of the invention information objects may be in the form of XML documents (conforming to the XML standard by the World Wide Web Consortium http://www.w3.org/XML/) having a tree-like structure according to the notation having a form of an XML schema (conforming to the XML Schema standard by W3C: http://www.w3.org/XML/Schema.) In this case an XML schema is designed to meet domain-specific description requirements for objects of the application domain in question. In creation of technical systems on the basis of the invention, data schemas recognized as industry standards in respective application domains may be used. In various embodiments of the invention each information object can be composed of one or a plurality of interrelated XML documents. In some embodiments of this invention XML documents are files in file systems of computer systems that store information objects, in other embodiments of the invention XML documents may be represented as data records stored in XML databases.

Methods for generating aforementioned information objects may be implemented in different ways. Specifically, a technical system can generate information objects automatically based on data input to the system by users or supplied from other sources.

In the process of generating internal structure of information objects they are assigned unique identifiers (UIDs.) A method for placing UIDs within the structure of information objects must be regulated by notations, according to which said IOs are generated.

Any digital codes ensuring the uniqueness of all information objects within a system built in accordance with this invention may be used as UIDs. Specifically, codes commonly accepted for object identification in pertinent application domains may be used. Certain specific embodiments of this invention may utilize codes of established systems for identifying digital objects produced by human creative activities as exemplified by books, films, musical compositions existing as content in a digital form (Digital Object Identifier), codes of product encoding schemes (EPC) by EAN-UCC and globally unique identifiers (GUIDs) of objects in common use in computer software.

The unique identifiers assigned to information objects are used later for addressing active units of storage, containing said IOs, in the logical storage network (described hereinafter), formed in accordance with the method provided in this invention.

After the intrinsic structure of an information object has been developed and said information object is incorporated in the active unit of storage being generated, a second step of AUS generation begins. During the second step a special program agent is added to the active unit of storage allowing said AUS to store links to other AUSs in the logical storage network and modify, if necessary, a list of links by adding new and removing old non-actual links (FIG. 1.) Additionally, a program agent comprises means allowing said active unit of storage to search across a logical storage network for other AUSs relevant to the search query.

In an embodiment of the invention, program agents are software modules performing appropriate functions. In one embodiment of the invention all software modules required for operation of the program agent are provided by a special hosting platform, on which a de-centralized repository resides (FIG. 1) Such approach implies that said modules are common for all active units of storage that are placed on the same computer system. However, in this case, for every active unit of storage an individual logical domain modeling an individual program agent with all necessary functions is created within said platform. Such approach may be used, for example, in deploying a system of servers intended to accommodate a repository for storing a large plurality of active units of storage.

In another embodiment of the invention each AUS gets a set of software modules and own hosting platform. For example, this may be the case when an active unit of storage (exactly, the information object embedded in it) describes a specific electronic device and resides on the same, on its computer platform (FIG. 1)

After an active unit of storage with an information object and a program agent comprising all required software modules is provided, it is stored in the memory of a storage device (physical storage unit) and added to a logical storage network (a method of adding an AUS is disclosed below.)

Figure 2:
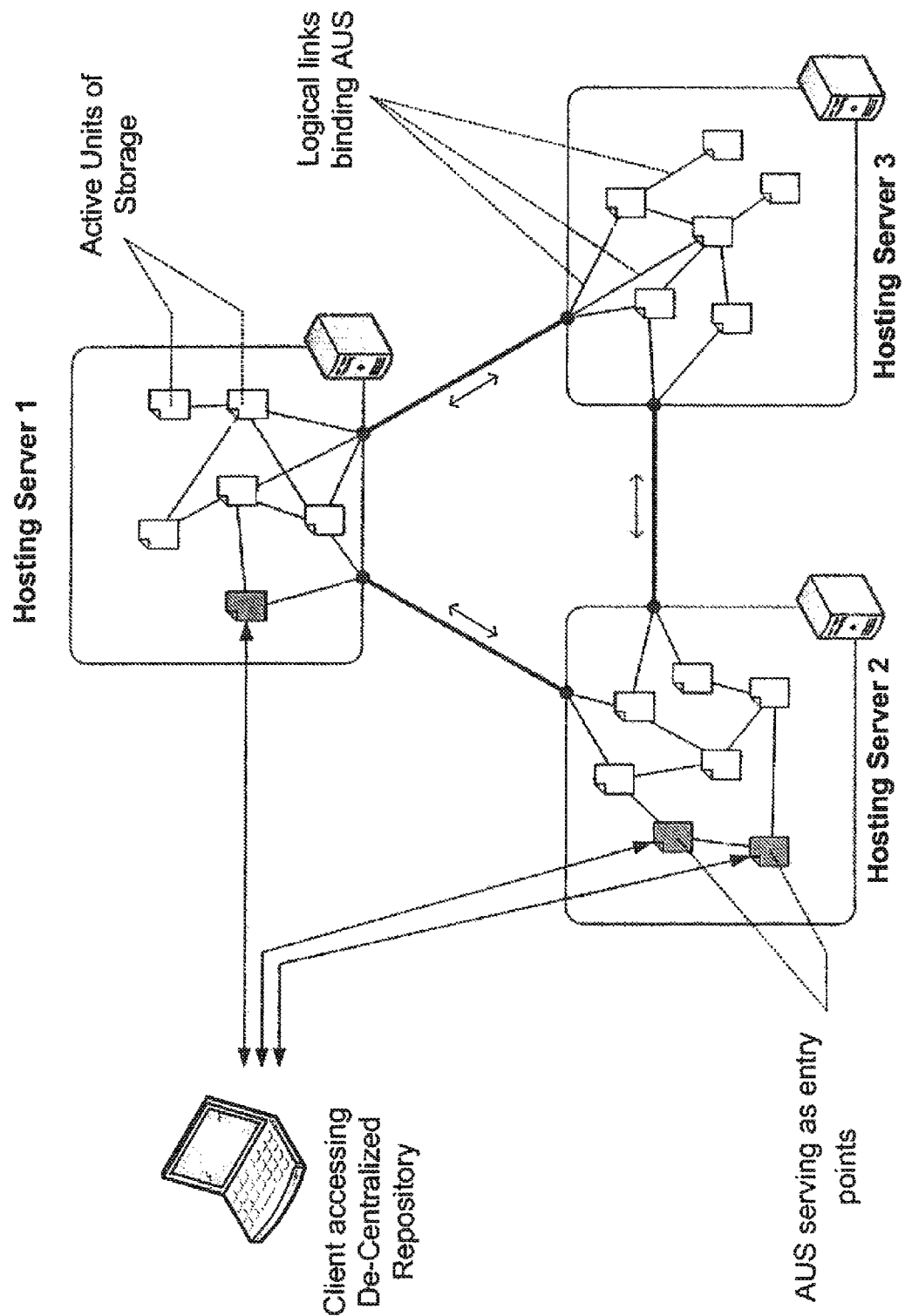
FIG. 2 depicts the relationship between a logical storage network formed by a plurality of AUSs and their logical bindings and a physical network of computer systems within the memory of which all the AUSs are located physically. The same diagram shows a method of remote access to the logical network by external systems performing search for necessary information and controlling the repository.

In accordance with the invention a logical storage network is a homogeneous peer-to-peer network, the nodes of which are active units of storage connected with each other by a plurality of logical connections. FIG. 2 depicts an example of a logical storage network. In this specification the term "node" in the context of a logical network will be used sometimes instead of the term "active unit of storage". Both said terms should be understood as equivalent and interchangeable. The terms "logical network", "logical storage network" and "logical peer-to-peer network" should also be understood as equivalent and interchangeable.

A distinguishing feature of the invention is that in its practical embodiments active units of storage may reside on any number of computer systems (and, therefore, on any number of hosting platforms) interconnected with each other by communication lines (FIG. 2 illustrates a layout of a logical storage network.) In this case an addition of every computer system to the repository system occurs transparently and requires no further reconfiguring. If the amount of stored units in a repository comprised of a plurality of computer systems becomes so large that the capacity of said computers prevent further growth of the repository size, users may simply deploy additional computers with a specialized hosting platform on them and enable their communication with other computers of said repository. By this means the system gains additional computing power allowing further increasing the number of active units of storage without interruption of service and reconfiguration of the entire repository. New AUS added to the system are automatically placed to "vacant" hosting platforms while at the logical layer it does not matter on what computer exactly this or that active unit of storage resides, and a plain growth of the number of nodes on the peer-to-peer logical storage network happens.

All AUSs of a logical network are interrelated, and every individual active unit of storage has connections with a certain limited sub-set of all AUSs belonging to the network.

Connections between active units of storage on the peer-to-peer logical network are of the logical (as distinct from the physical) nature and for the sake of convenience in further discussion will be denoted by the term "logical connections". In a graph model of a logical storage network, graph ribs represent logical connections between individual AUS (while graph nodes correspond to AUSs themselves). In a specific embodiment of this invention logical connections are links of active units of storage to a plurality of other AUSs. In another embodiment of the invention said links are uniform resource identifiers (URIs) within information objects embedded in respective active units of storage on the logical peer-to-peer storage network.

Links for every node on a logical network are stored in a special list of links associated with said node (FIG. 1.) Physically, information objects incorporated into active units of storage and lists of links may be stored in the file system of the storage devices, on which the repository is deployed while program agents belonging to AUSs physically being components of a hosting platform.

Drawing the analogy between nodes and subscribers of a telephone network, the list of links can be considered as a subscriber's book of phone contacts. Another feature of the invention is that there is no global list of all links, i.e. a general telephone directory does not exist, and the listing of subscribers and their phone numbers is distributed among all individual books of phone contacts kept by subscribers.

In another embodiment of the invention the list of links is made using the universal language XLink for describing connections between objects (the XLink language is a standard presented by W3C: http://www.w3.org/XMULinking.) The use of the XLink language allows flexible and convenient description of the connection structure of all active units of storage on a logical storage network based upon a well-known international standard.

Logical connections between active units of storage can be symmetric and asymmetric. Symmetric logical connections (bindings) represent bidirectional links between AUSs. In other words, if a symmetric logical connection exists between objects A and B that means that object A has a link pointing to object B, while object B has a link pointing to object A.

Asymmetric logical connections represent unidirectional links between individual AUSs, that is if a logical connection of objects A and B is asymmetric, it means that either object A has a link pointing to object B or object B has a link pointing to object A. There is no a link in inverse direction.

In one embodiment of the invention logical connections between all active units of storage on a logical network are symmetric, in another embodiment of the invention there are both symmetric and asymmetric logical connections connecting AUSs on said network.

A method for generating logical connections between AUSs on a logical storage network provides a structure that allows the entire network of active units of storage to be presented as a connected graph. This property means that transitions on logical connections between individual nodes on the network it is possible to reach any node starting from any node.

Hereinafter the term "path" will be used to denote a set of nodes on a way from one arbitrary active unit of storage to another one in a peer-to-peer logical storage network. The number of logical connections that constitute the path is named "path length".

Another feature of the method for generating logical connections between nodes according to the invention is that it provides a peer-to-peer logical storage network with a Small-World property. The merit of said property is that in a network with millions of active units of storage, each pair of nodes are connected with each other by a path going through no more than 5-6 intermediate nodes on the average, which is achieved with a comparatively moderate number of logical connections of every node with other nodes on the network. The number of logical connections for every node on a logical storage network can be represented as a random variable having a power-series distribution.

Generation of logical connections for active units of storage occurs during their addition to a logical network. In an embodiment of the invention a method of adding an AUS comprises the following: comparing, in series, the information object belonging to the active unit of storage to be added with one or more IOs of active units of storage already presented in the repository and determining, during each of such comparison, the degree of information similarity between said new information object and currently compared information object in the logical storage network. A method for determining an IO's information similarity is another feature of the invention and is described below.

As the comparison proceeds, in the space of the logical storage network with determined metrics (the metrized space of logical network) a set of active units of storage is selected the information objects of which have (among all their neighbors) minimum metric distance to the IO belonging to said added storage unit. Such units of storage are referred to as local minima (in the sense that in the perspective of an added AUS these represent local minima in the metrized space.) The active units of storage thus selected have the greatest degree of information similarity to the added AUS in the sense that information objects incorporated into them are closest by the metric to the IO belonging to the added unit of storage.

Then, the added active unit of storage, by means of the program agent incorporated into it, sets up logical connections to other AUSs from the selected set, thus integrating into the logical storage network. The power of set of the selected AUS is the parameter of addition to the logical storage network and an indicator of quality of its building and of efficiency of specific search algorithms in the logical network.

In one embodiment of the invention a method for removing active units of storage from a logical storage network comprising: marking an AUS as subject to removal and not removing it actually during a first step. At the same time, said active unit of storage losses its properties to be a retrievable object on a logical network. It cannot be found, however, it retains all logical connections with other AUSs on the network and continues to provide routing functions for search queries passing via it thus ensuring the integrity of the logical storage network intrinsic structure. In this case, even if the information of the removed IO fully matches the AQO, the object subject to removal will not be included to a set of retrievable objects.

Meanwhile, information objects of all newly added active units of storage are compared with the IO of the unit of storage subject to be removed and when any of newly added AUS is found to be close enough to the removable active unit of storage (in terms of the metric distance between their respective information objects) such AUS will be added to the network by substitution for the removed AUS. The criterion of sufficient closeness consists in satisfying the following relation $M \leq T$, where M denotes the metric distance between the added active unit of storage and the removable AUS, and T is a certain threshold that is a parameter of the substitution procedure. Said parameter is subject to optimization in a specific embodiment of this invention.

Replacing active unit of storage A with active unit of storage B comprises inheriting by B all logical connections of A and thus taking its place in the structure of the logical storage network. Thereupon, active unit of storage A is completely removed from both the logical network and physical repository (from the memory of repository storing devices.)

Yet in another embodiment of the invention the active unit of storage to be substituted is retained in the physical repository. Instead, the information object and the list of links to other AUSs that were components of said active unit of storage are archived and stored in the physical repository, for example, for access at a later time by law enforcement agencies, historians, journalists etc.

Figure 3:
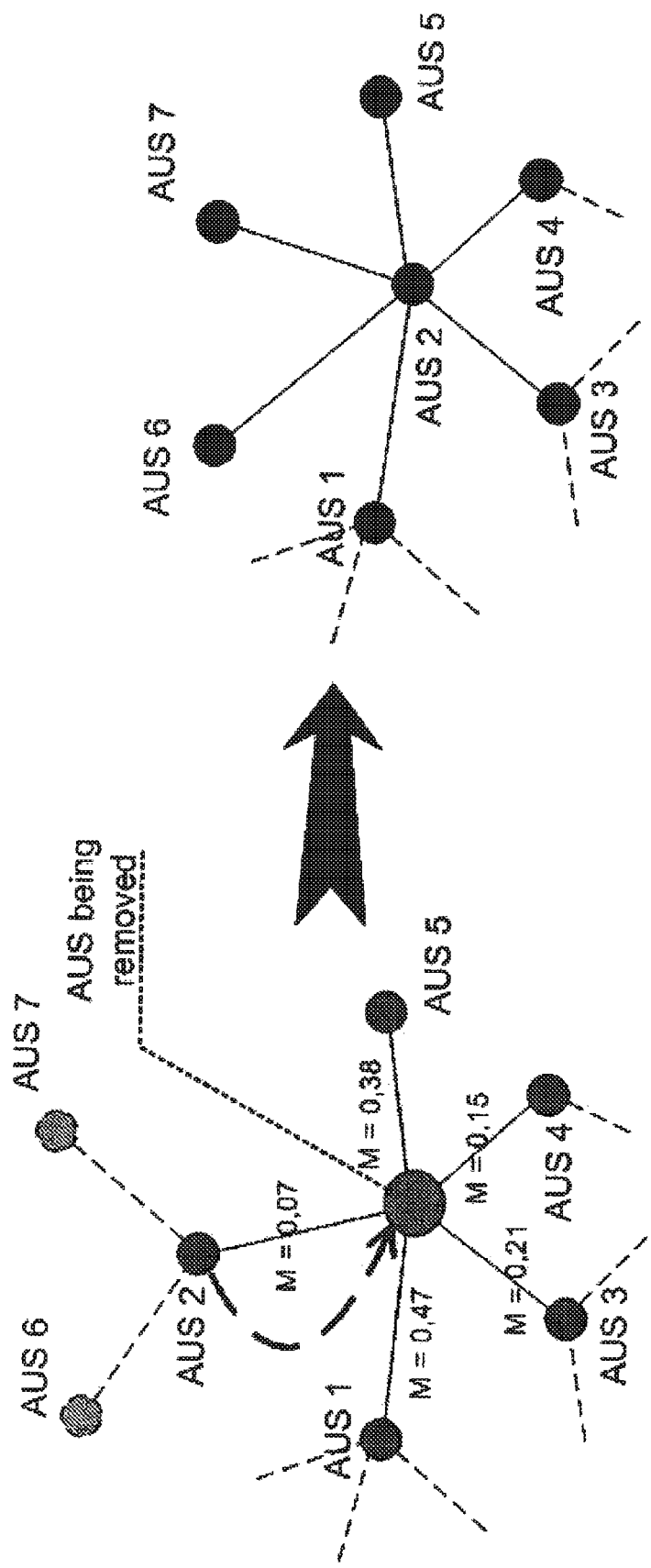
FIG. 3 depicts a method for removing active units of storage from the logical network.

In another embodiment of the invention, upon receipt of a command to remove an active unit of storage it is removed both from the logical network and from the physical repository. At the same time, active units of storage to which the removed AUS was connected by logical connections (a set of them is denoted as N) get re-connected by logical connections according to a special "crossing algorithm" (see FIG. 3). The "crossing algorithm" in said embodiment is a method, wherein from all active units of storage belonging to the set N one being the closest by metric distance to the removed AUS is selected as replacing a vacant place of the removed unit of storage, and all other elements of the set N form logical connections with this replacing AUS.

In a third embodiment of the invention a complex method for removing active units of storage is used that comprises both above said methods. The choice of a specific method in said embodiment depends on the number of logical connections that the active unit of storage to be removed has. The following considerations are taken into account in this case: the more logical connections the removed AUS has, the greater is the effect of its removal on the topology of the logical network of storage; in addition, the logical network of storage is organized in such way that graph's node degree has power-law distribution, which means that the total number of active units of storage having numerous logical links is much less than the number of units of storage having few connections.

The greater is the degree of the removed node, the greater is the preference of the replacement method for removing active units of storage. And conversely, the fewer logical connections the removed AUSs have, the greater is the probability that they will be removed by the "crossing" method.

While modifying information objects incorporated into active units of storage on the logical network, said AUSs dynamically alter their logical connections and thereby their placement on the logical storage network. Therefore, in the graph model of the logical network, the nodes corresponding to these active units of storage will finally have logical connections with a plurality of nodes different from the initial plurality of nodes with which connections existed before modification of the information object. Re-structuring of logical connections of active units of storage is enabled by program agents incorporated into them.

In one embodiment of the invention, re-structuring of logical connections of an active unit of storage during modification of the information object incorporated into it, comprises removing said AUS from the logical storage network and subsequent re-adding it to the network.

In accordance with the invention, a method for determining a measure of information similarity of information objects embedded in active units of storage is based on representing IOs as labeled trees with designated roots (herein referred to as "main roots") and oriented so that there are directed paths from roots of said trees to any their vertices. For simplicity's sake, henceforward such trees will be termed labeled rooted trees.

A labeled rooted tree, as used in this context, represents a mathematical model of an information object intrinsic structure. The tree's root in this case is the principal parent element that forms the basis for the IO's tree structure. Tree vertices are all elements that constitute the IO's intrinsic structure. The terms "tree vertex" and "tree node" must be taken as equivalent and interchangeable. A root is the special case of the tree's node. Tree node labels are the values contained in said elements of the IO intrinsic structure. Tree node labels in information objects may be words of natural languages, numbers and other mnemonics.

Hereinafter the following designations are used:
$T_i$—tree, modeling the i-th information element;
$R_i$—root of the i-th tree;
$n_i$—number of the i-th tree's nodes.

The concept of a metric or metric distance is introduced here to define the degree of information similarity between individual IOs. A metric between two information objects $T_1$ with $n_1$ nodes and $R_1$ root and $T_2$ with $n_2$ nodes and $R_2$ root is generally defined as a metric tensor determined by a matrix of the size $n_1 \times n_2$: $\{\rho(T_1, r_1, T_2, r_2)\}_{n_1, n_2}$, where $r_1$, $r_2$ are two nodes (of $T_1$, $T_2$ respectively) designated as temporary roots.

Every i,j element in such a matrix is obtained by calculating the metric function $\rho$ between two isomorphically transformed trees $T_1$ and $T_2$, wherein the $T_1$ tree is transformed by declaring its i-th node as the tree's temporary root and restructuring the entire tree relative to said node (the direction of all tree arcs remaining unchanged during transformation) and the $T_2$ tree is transformed in the same manner, but by declaring its j-th node as a temporary root. After isomorphic transformation, the trees are no longer orientated from the root.

A tree transformation by the i-th node is called the i-th aspect of the information object. Each IO has as many possible aspects, as there are nodes in it. An untransformed tree is the primary or main aspect of the information object. All other possible aspects are termed auxiliary (or temporary.)

Hereafter the term "tensor metric" will be used to signify the described above metric between two IOs. In addition to a tensor metric, the main metric $\rho_{main}(T_1, T_2) = \rho(T_1, R_1, T_2, R_2)$ is defined as the value of a metric function of two untransformed trees, that is of two IOs in their primary aspects.

Besides, a relevance function $rel(r,T)$ is introduced, representing the distance from the root to the r node of the T tree. The distance is defined as a path length, measured in the number of arcs from the tree root to its arbitrary node r. As is obvious from the definition, the relevance function takes non-negative integer values.

Furthermore, an integral metric $$\rho_{int}(T_1, T_2) = \sum_{r_1 \in T_1} \sum_{r_2 \in T_2} w(rel(r_1, T_1)) w(rel(r_2, T_2)) \rho(T_1, r_1, T_2, r_2)$$

is introduced, wherein w is the relevance weight. The relevance weight acts as an indicator showing value of importance that the node's position has in the tree structure while estimating the information similarity of two IOs. According to the present method, the relevance weight is entered as a parameter conforming to the following requirement: the relevance weight decreases as its argument, i.e. the value of relevance function, increases. In other words, the closer a node is positioned to the tree's root, the greater its contribution to the general result of calculating the integral metric. In case of increasing a distance from the tree's root, the reverse is true, correspondingly.

The greater is dissimilarity in the intrinsic structure and component values between compared IOs, the greater the $\rho_{int}$ value.

It should be noted that the main metric $\rho_{main}$ is a special case of the integral metric $\rho_{int}$ with the relevance weight defined as 1 for the argument equal to 0, and defined as 0 for all other values of the argument.

Integral and tensor metrics act as decision-making criteria in methods of the present invention. Said metrics are used as a measure of information similarity of IOs (and hence, of the active units of storage comprising said IOs) both in a method for adding AUS to a logical storage network and in a method for modifying and removing them from the network; also said metrics are used in a method for retrieving active units of storage, comprising information objects relevant to search queries. Either the integral (being the special case of the main metric) or the tensor metric is used depending on specific requirements.

The metric function $\rho(T_1, r_1, T_2, r_2)$ is determined through a similarity measure $c(T_1, r_1, T_2, r_2)$ for two trees $T_1$ and $T_2$ as follows: $\rho(T_1, r_1, T_2, r_2) = (c(T_1, r_1, T_2, r_2))^\alpha$. The similarity measure $c(T_1, r_1, T_2, r_2)$ equals the power (number of nodes) of the greatest rooted subtree (or the power of two largest isomorphic (taking into account node weights) rooted subtrees) common for these two tree, isomorhpically transformed relative to their designated temporary roots $r_1$ and $r_2$ respectively The rooted subtree in this discussion is such a subtree of the rooted tree under consideration, which has the same root as the rooted tree. The numerical parameter $\alpha$ is taken negative (to provide inverse ratio of the metric function to the similarity measure) and in one embodiment of the invention assumes values less than $-1$.

The metric function is in fact a means of determining the degree of similarity (community) between intrinsic structures of two IOs. However, the similarity of structures of two IOs is evaluated by the number of shared nodes only. The relevance functions together with relevance weights supplement the metric function and jointly enable a more precise evaluation of the similarity of IO internal structures, now taking into account the significance level of all nodes in the internal structures.

It should be noted that one of the metric function's properties is that with the similarity measure for two trees equal to zero (it occurs when temporary roots of compared trees have different values) the function is undefined (as a division by zero takes place during its calculation.) In such cases the metric function is extended with the "infinity" value, denoted by the symbol $\infty$.

Taking into account the abovementioned property of the metric function, optimization of the tensor metric is undertaken in one embodiment of the invention. The optimization method comprises storing only those elements of a tensor metric which do not take on the value $\infty$ or values exceeding a certain threshold $\beta$, which is an optimization parameter.

Figure 4:
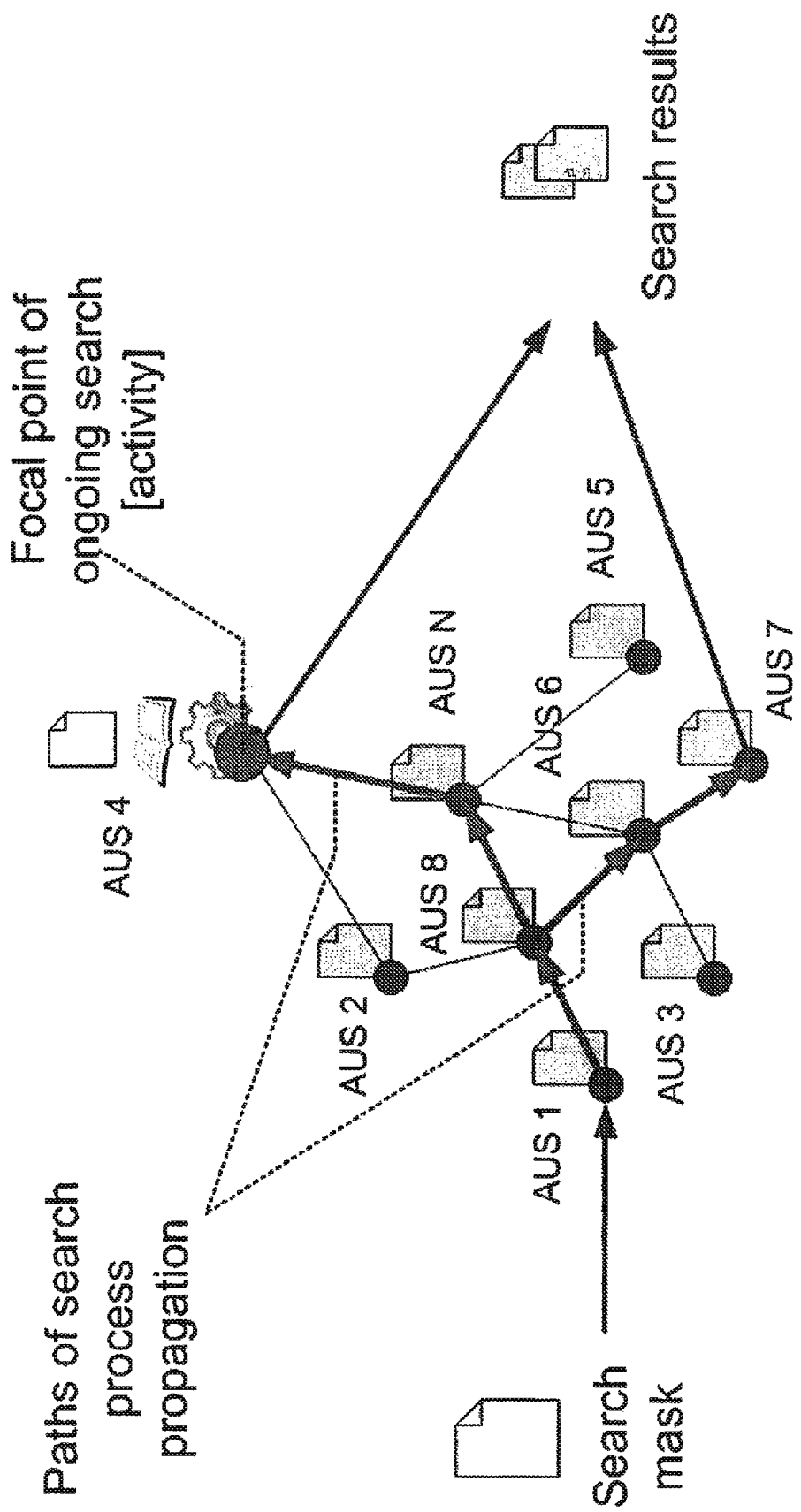
FIG. 4 illustrates a method for searching for active units of storage matching a search mask on a logical storage network.

According to the present invention a method for finding active units of storage on a logical network comprises several consecutive steps (the search method is illustrated in FIG. 4.) During a first step, on the basis of a query, a special information entity is generated that is called a search mask. A tree-like structure similar to the intrinsic structure of IOs incorporated into the active units of storage on the logical network is generated for the search mask. In generation of search masks the same notations (data schemas) are used as those that form the basis for information objects in the repository: However, unlike IOs search masks may not conform to said notations precisely. Data schemas just define the internal structure of search masks in general, and provide a general guideline for generating a tree of components of the search mask.

In doing so, every node in the structure of each sought information object is associated with a node (with identical positioning in the tree) in the search mask structure. The value of data contained in a mask node is called a partial information object search criterion. Hereinafter the concepts "search of an information object" and "search of an active unit of storage, comprising the sought information object" must be considered as equivalent and interchangeable.

By way of illustration for the aforementioned, if there is a logical network for storage of musical compositions, and a search query comprises the title of a sought music piece, a search mask will be generated based on the search query and structured so that in the position, where information objects have titles of musical compositions, there will be positioned search information acting as a partial search criterion denoting that musical compositions with titles corresponding to said partial criterion should be retrieved.

A plurality of all partial search criteria (the entirety of all data within the mask nodes in terms of the mask intrinsic structure) constitutes a complete search criterion for searching information objects by said mask.

If an information object conforms to the complete search criterion, it is referred to as fully relevant to the search query on which basis the search mask that defines said complete criterion was created. When an information object does not conform to the complete search criterion but conforms to some of its partial criteria, such object is called partially relevant to the search query. In the event an information object does not meet any partial search criterion, it is referred to as irrelevant to the search query.

An active unit of storage is called relevant (or partly relevant) to the search query (search mask), if the information object incorporated into it is relevant (or partly relevant) to said search query.

Partial search criteria may be uniquely defined (single-valued) and not uniquely defined (multi-valued.) A unique partial search criterion is defined by a single specific sought element value in the tree structure of the search mask. All information objects in the repository, the respective description tree element of which has a value that exactly meets said partial criterion will conform to this criterion. A multi-valued partial search criterion defines a range of possible values for the sought element in the mask tree structure, and all information objects in the repository, the values of the respective elements of which fall within said range will meet such a criterion.

For example, if a query mask comprises an element describing the title of a musical composition and only one variant of the description exists, said element is a single-valued partial criterion. All musical compositions having the specified title will meet such partial criterion. If, however, the search mask comprises an element describing a plurality of possible paintwork colors (blue, black, red, etc.) of a car, said element is a multi-valued partial criterion. All cars with a paintwork color among the plurality of described values (either blue, or black, or red, etc.) will meet such a multi-valued criterion.

In accordance with the present invention there are several ways to define a range of possible values for multi-valued partial search criteria:

"Any value" means that all information objects with any value of the appropriate element in their intrinsic structure meet this partial criterion.

"Any value from a list of . . . " means that all information objects having a value of corresponding element of its intrinsic structure, the value belongs to a set of specified variants (in the list of possible values), meet the partial criterion.

"Greater than $\alpha$", "not less than $\alpha$", "not greater than $\alpha$", "less than $\alpha$", "greater than $\alpha$, but less than $\beta$", etc. —this way is used for partial search criteria which values can be represented in numerical form, and prescribes that all information objects, the values of the proper intrinsic structure element of which fall within the specified range, meet the partial criterion.

"Except values in the list" defines that all information objects with the values of proper elements not matching those in the list meet the partial criterion.

After the search mask is generated, a search of active units of storage on the logical storage network that comprise information objects matching said search mask begins (FIG. 4.) The search may be performed with different degree of relevance of an information object to the search mask (and hence to the search query) depending on search procedure conditions and requirements. The required relevance degree of a result to the search mask is a parameter of the search method and is defined every time at the initiation of search procedure. A relevance degree value is either configured automatically based on the search procedure requirements, or is specified by the user each time. For the sake of simplicity the term "relevance" will be used below to mean a relevance with predefined accuracy.

The aforementioned search procedure is of a distributed nature as it involves program agents of all active units of storage presented in the logical storage network (explained below in greater detail).

Along with the required relevance degree of search results, additional search parameters may include: a maximum number of active units of storage considered in the process, a maximum duration of the search procedure, etc.

In accordance with the method, initiators of a search on a logical storage network may include either active units of storage themselves on said network or entities external to said network, for example, applications for managing a logical storage network and providing services to its users on the basis of the network.

As a feature of the present invention, in one embodiment after generation of a search mask from a search query a special active query object (AQO) is generated based on said search mask, the AQO is added to the logical storage network using the same method for placement on a logical network as in adding active units of storage, namely, said active query object establishes a plurality of logical connections to AUSs on the network, and, similarly to an ordinary active unit of storage, participates in routing of movement of current search points (described below) and may be either a searched object itself or a search initiator.

The most important function of active query objects is keeping actuality of query result information. For example, when an AQO with a query of "how many cars of such model are there?" is input in the logical storage network with data about cars, said object will periodically initiate queries of this kind and keep their results.

A particular time schedule of initiating retrieval queries by said active query object is determined by a plurality of factors, the most important of which include: the required degree of actuality ("freshness") of provided information about search results, data updating frequency for the logical storage network, load, in terms of queries, of logical network nodes, processing capability of computer systems and throughput of communication channels at physical implementations of the repository, etc.

In yet another embodiment of the invention active query objects are not placed among active units of storage but form their own logical network built in accordance with the same principles as a network of AUSs that describe entities of the application domain. Such logical network of active query objects in the present description is referred to as "meta-network".

In this case, each active query object on the meta-network has a corresponding set of AUSs, in the logical storage network, relevant to the subject-matter search query to which the AQO is related (with the required relevance degree.)

All active query objects from the meta-network will periodically initiate search queries addressed to the logical network of active units of storage to keep actuality of their information for retrieval of which they are designed.

Defining the term "entry point" of a search process is of prime significance in the description of search method. "An entry point" is an active unit of storage or a node in a graph model of the logical storage network, from which a search of the AUS comprising an information object relevant to the search mask starts (FIG. 2.)

In one embodiment of this invention any node in a logical storage network can be an entry point. If an active unit of storage initiates search for other AUSs, it plays role of the search entry point.

Search initiation by an active unit of storage may be caused by users or occurred automatically, as a part of more complex unattended processes of interoperation between electronic devices.

In the embodiments of the invention where users initiate search queries, user interfaces are required to allow entering search queries with subsequent initiating search through one of the active units of storage on the logical network.

The selection of a particular AUS is conditioned by specifics of technical embodiments of the invention. For example, if an active unit of storage is a component of a more complex system, either of a software or software/hardware system, it provides the system with services for searching other similar systems, acting at the same time as an entry point in the logical storage network for this specific instance of the system, in other words, all search queries generated by the system will be initiated through the AUS.

Another embodiment of the invention comprises utilizing a limited subset of nodes, as entry points on the logical storage network and a special server for balancing load of entry points for distributing workload evenly across the plurality of entry points in the logical storage network. At the same time, a server address represented in a particular embodiment of the invention as URL, is written to all active units of storage newly added to the logical network. Physically the load balancing server may be deployed on any computer system having access to the repository physical network of computers. The server can be deployed on a computer comprising a hosting platform and being a component of a decentralized repository. In another embodiment of the invention the load balancing server is a separate service, external to the distributed storage system. Physically, the service may reside on a separate computing device connected to the distributed repository by communication lines. As a result, if any active unit of storage initiates a query to search for other AUSs in the logical storage network, it first queries the load balancing server which responds with the entry point address with which the search should begin. The number of entry points and their workload in such system are dynamically configured by the load balancing server depending on query intensity at the moment, and query throughput of the entry points for servicing the search queries.

Since the search process, as explained below, is of a distributed nature and alternately involves various nodes of the logical storage network, a special term is introduced into this description—"a point of current activity of the search progress" or "current search point" defining the current point (active unit of storage) on the logical network that is involved in a search at the moment or, in other words, in which search activity of the search procedure in focused (FIG. 4.)

It should be noted that according to the present invention all search operations in a logical storage network are distributed and decentralized in nature and are performed by means of program agents of active units of storage. At every time moment, operated are the program agents of those AUSs only, where the current search point is positioned at this moment.

During a search process the current search point moves consecutively from an entry point to other nodes in the logical storage network over logical connections between said nodes (FIG. 4.) A distinctive feature of the process is that in every active unit of storage in which the current search point arrives the information object incorporated into it is compared with the search mask using the metric described above.

As mentioned above this comparison is performed by the program agent of said AUS. Physically, the comparison is performed by means of the hosting platform that provides program agents to active units of storage. The purpose of the comparison is to determine the degree of information similarity between the query mask and the information object belonging to the currently active unit of storage; in other words—to determine in what degree said AUS is relevant to the search query. The completion of said comparison is followed by making a decision if the search goal has been achieved. This decision depends, firstly, on whether the active unit of storage currently under consideration is relevant to the search query with the relevance degree defined for said search procedure, and, secondly, on whether the required number of relevant AUSs have been found.

The required maximum number of active units of storage relevant to the query is another parameter of a search procedure and is determined by particular search tasks and situations. The required number may vary from 1, for example, in queries like: "find at least one object complying to the following requirements", to an infinite number (for example, "find all objects complying to certain criteria" or "what is the total number of objects of this kind in the repository".

If AUS in question is relevant to the search query and all other relevant active units of storage that constitute the required number have been found, the information about the AUS is returned to the node of the logical storage network or external entity that initiated the search, and the search procedure completes.

If not all of the required plurality of active units of storage have been found and/or AUS in question does not possess the sufficient degree of relevance, the search process continues and its next step includes selecting the next candidate node where the current search point is moved, and the entire aforementioned procedure recursively repeats.

The next candidate node is selected from the plurality of all active units of storage with which the current node (being current at the moment of presenting the current search point in it) has logical connections as well as from all AUSs being neighbors (in terms of logical connections) to the nodes located along the whole previously traveled search path (FIG. 4.)

A distinctive feature of the method for selecting next candidate nodes is that as a result, the current search point moves in the direction of increasing relevance of nodes to the search mask (that is in the direction of increasing information similarity between the mask and information objects embedded in active units of storage). At the same time, at certain stages of its travel the current search point may occasionally move to less relevant nodes (recede), although in general it will always advance in the direction of growing relevance. Therefore, one might expect that the majority of sought active units of storage (and, consequently, information objects embedded in them) are likely to be found on final legs of the current search point travel across a logical storage network.

The invention claimed is:

1. A system for storing, searching and retrieval of a plurality of information objects of an arbitrary application domain, comprising:
   a distributed computer system comprising one or a plurality of computing devices connected with each other by communication lines,
   a connected logical storage network, wherein each node is an active unit of storage (AUS) and connections between nodes of said network are formed by links of one active units of storage to others,
   wherein every active unit of storage resides on one of the computing devices of said distributed computer system and comprises:
   at least one of said plurality of information objects (IOs), each of which is represented in a tree-like structure,
   a list of links to a certain plurality of other active units of storage by means of which said AUS participates in the operation of the logical storage network, and
   an associated program agent that allows performing operations on said AUS in connection with searching, storing and retrieving information by user requests using said list of links, wherein a program agent of each active unit of storage compares the IO incorporated into it with the IO of any other AUS and based on the comparison results computes the value of metric distance between the compared IOs and the IOs are electronic documents in the form of XML documents.

2. The system according to claim 1, wherein intrinsic structure of information objects is subject to notations specific for application domains to which said IOs belong.

3. The system according to claim 1, wherein XML documents are in the form of XML files in the file systems of computing devices storing IOs.

4. The system according to claim 2, wherein the notations are XML notations conforming to the XML Schema standard.

5. The system according to claim 1, wherein the information objects are assigned Unique Identifiers (UID).

6. The system according to claim 5, wherein the UIDs are assigned Electronic Product Codes (EPC).

7. The system according to claim 5, wherein the UIDs are Globally Unique Identifiers (GUIDs).

8. The system according to claim 1, wherein the links between IOs are unidirectional.

9. The system according to claim 1, wherein the links between IOs are both bidirectional and unidirectional.

10. The system according to claim 1, wherein the links are in the form of Unique Resource Identifiers (URI) of objects.

11. The system according to claim 1, wherein the links between IOs are described in XML documents of the XLink format.

12. The system according to claim 1, wherein a subset of nodes on the logical storage network are used as entry points to said network, and there is a special server for dynamic balancing of workload among the entry points and determining the total number of entry points.

13. The system according to claim 12, wherein the server for dynamic balancing of workload among entry points is physically implemented on a hosting platform of one of the computing devices of the distributed computer system.

14. The system according to claim 12, wherein the server for dynamic balancing of workload among entry points is physically implemented as a stand-alone service, external to the distributed system for storing information objects.

15. The system according to claim 12, wherein the infrastructure for dynamic balancing of workload among entry points acts as an intermediary that refers every client system accessing the logical storage network to one of the nodes on the logical network which becomes an entry point of the logical storage network for said accessing client system.

16. The system according to claim 15, wherein an entry point is selected depending on a current query rate at each time moment and a query throughput of entry points for serving search queries.

17. The system according to claim 1, wherein the active units of storage dynamically rebuild their logical connections in response to every modification of information objects of AUS on the logical storage network.

18. The system according to claim 17, wherein the dynamic rebuild of logical connections of an active unit of storage in the logical storage network is effected by means of a program agent incorporated into said AUS.

19. The system according to claim 1, wherein the metric distance between two IOs is defined as a matrix of size $n_1 \times n_2$: $\{\rho(T_1,r_1,T_2,r_2)\}_{n_1,n_2}$, where $T_1$, $T_2$ are rooted trees modeling the intrinsic structure of compared IOs, $r_1$, $r_2$ are two nodes (from $T_1$ and $T_2$ respectively), designated as temporary roots, $n_1$ and $n_2$ are the number of nodes in the structure of the first and second IO respectively; therewith $\rho(T_1,r_1,T_2,r_2)=(c(T_1,r_1,T_2,r_2))^\alpha$, where $c(T_1,r_1,T_2,r_2)$ is the similarity measure equal to the power (number of nodes) of the largest subtree common for two compared IO trees isomorphically transformed relative to designated temporary roots $r_1$ and $r_2$, respectively, and $\alpha$ is a numeric parameter assuming values $\alpha < -1$.

20. The system according to claim 19, wherein the metric distance principal value $\rho_{main}(T_1,T_2)=\rho(T_1,R_1,T_2,R_2)$ is defined as the value of the metric function for two untransformed trees.

21. The system according to claim 19, wherein the integral value of the metric distance between two IOs is defined as $$\rho_{int}(T_1, T_2) = \sum_{r_1 \in T_1} \sum_{r_2 \in T_2} w(rel(r_1, T_1)) w(rel(r_2, T_2)) \rho(T_1, r_1, T_2, r_2),$$

wherein rel(r,T) is the relevance function equal to the distance from the root to the r node in the T tree, and the distance is a path length measured as the number of arcs from the tree root to its r arbitrary node, and w is relevance weight indicating the significance of the node positioning in the tree structure during calculation of the degree of information similarity between two IOs.

22. The method for adding information about new objects of an arbitrary application domain to the system for storage and retrieval of a plurality of information objects according to claim 1, comprising the steps of:
   a) organizing information about new objects in a tree structure thereby creating an information object (IO) in the connected logical storage network of said system,
   b) associating with each created IO a program agent designed for performing operations on said IO, and a list of links to other IOs on the logical storage network, creating thereby an active unit of storage,
   c) comparing the IO incorporated into every created AUS with the plurality of other IOs already presented on the connected logical storage network, and determining the metric distance between the IOs based on the comparison results, d) creating for a plurality of those AUSs which IOs are closest by metric distance to the added IO, logical connections to the AUS comprising the added IO, e) for all links in the list of links of the added AUS, recording metric distances to all information objects corresponding to the links, and f) saving the added AUS on one of the computing devices of said system, wherein the IOs are electronic documents in the form of XML documents.

23. The method according to claim 22, wherein in generating logical connections, incorporating appropriate links in the link lists of both added and existing active units of storage.

24. The method according to claim 22, wherein the metric distance between two IOs is defined as a matrix of the size $n_1 \times n_2$: $\{\rho(T_1,r_1,T_2,r_2)\}_{n_1,n_2}$, where $T_1$, $T_2$ are rooted trees, representing the intrinsic structure of compared IOs, $r_1$, $r_2$ are two nodes from $T_1$ and $T_2$ respectively, designated as temporary roots, $n_1$, $n_2$ are the number of nodes in the structures of the first and second IO respectively;

therewith $\rho(T_1,r_1,T_2,r_2)=(c(T_1,r_1,T_2,r_2))^\alpha$, where $c(T_1,r_1,T_2,r_2)$ is the similarity measure equal to the power (number of nodes) of the largest subtree common for two compared IO trees isomorphically transformed relative to the designated temporary roots $r_1$ and $r_2$ respectively, and $\alpha$ is a numeric parameter assuming values $\alpha < -1$.

25. The method according to claim 22, wherein the metric distance principal value $\rho_{main}(T_1,T_2)=\rho(T_1,R_1,T_2,R_2)$ is defined as the value of the metric function for two untransformed trees.

26. The method according to claim 22, wherein the integral value of the metric distance between two IOs is defined as $$\rho_{int}(T_1, T_2) = \sum_{r_1 \in T_1} \sum_{r_2 \in T_2} w(rel(r_1, T_1))w(rel(r_2, T_2))\rho(T_1, r_1, T_2, r_2),$$

where $rel(r, T)$ is the relevance function equal to the distance from the root to the r node in the T tree, and the distance is a path length measured as the number of arcs from the tree root to its r arbitrary node, and w is relevance weight indicating the significance of the node positioning in the tree structure during calculation of the degree of information similarity between two IOs.

27. A method for searching and retrieving information about objects of an arbitrary application domain in the system for storage and retrieval of a plurality of information objects according to claim 1, comprising the steps of:

a) generating a search mask comprising information relevant to the information to be retrieved from said system, and said search mask being an information object (IO) with a tree structure similar to the tree structure of information objects stored in said system, b) generating based on said search mask an active query object (AQO) comprising search criteria, c) comparing the AQO with IOs embedded in a each of the plurality of active units of storage on the logical storage network of said system, wherein moving from AUS to AUS following existing logical connections between them is performed in the direction of decreasing metric distance between the information objects incorporated into AUS, and d) retrieving an IO meeting the search criteria specified in the AQO.

28. The method according to claim 27, wherein a program agent for performing operations on the AQO is included in the AQO.

29. The method according to claim 27, wherein the AQO is added to the logical storage network of said system.

30. The method according to claim 27, wherein the AQO is added to a meta-network every node of which is an active query object.

31. The method according to claim 27, wherein the AQO periodically updates the information embedded in it through search queries to appropriate AUSs on the logical storage network of said system.

32. The method according to claim 27, wherein comparison is performed by means of a program agent incorporated into the AQO.

33. The method according to claim 27, wherein each AQO on a meta-network has associated a plurality of information objects in the logical storage network that are relevant to the subject-matter search query to which the active query object is related.

34. The method according to claim 27, wherein search parameters include at least one of:
 a required degree of actuality of information returned by search,
 a frequency of data updating on the logical storage network,
 a degree of loading the nodes on the logical network by queries,
 capabilities of computer systems and throughput of channels connecting them,
 a number of metric distance calculation operations,
 a required relevance degree of returned information, and
 time allocated for each individual search procedure.

35. The method according to claim 27, wherein the search mask is generated using the same notations as those used in information objects stored in the repository; wherein each node in the structure of sought information objects is paired with a node in the structure of the search mask; the data value contained in a node of the mask is a partial search criterion for IO; combination of all partial search criteria provides a complete criterion for mask search of information objects.

36. The method according to claim 27, wherein partial search criteria may be single-valued and multi-valued.

37. The method according to claim 27, wherein searching of the information objects is performed with different degrees of their relevance to the search mask depending on search conditions and requirements.

38. The method according to claim 27, wherein nodes of the logical storage network may be search initiators.

39. The method according to claim 27, wherein any nodes on the logical storage network may be entry points for a search process.

40. The method according to claim 27, wherein a subset of nodes of the logical storage network are used as entry points for a search process; and a special infrastructure is provided for setting the total number of entry points and dynamic balancing of workload among the entry points.

41. The method according to claim 27, wherein the metric distance between two IOs is defined as a matrix of size $n_1 \times n_2$: $\{\rho(T_1,r_1,T_2,r_2)\}_{n_1,n_2}$, where $T_1$, $T_2$ are rooted trees, representing the intrinsic structure of compared IOs, $r_1$, $r_2$ are two nodes, designated as temporary roots, from $T_1$ and $T_2$ respectively, $n_1$, $n_2$ denote the number of nodes in the structures of the first and second IO respectively; therewith $\rho(T_1,r_1,T_2,r_2)=(c(T_1,r_1,T_2,r_2))^\alpha$, where $c(T_1,r_1,T_2,r_2)$ is the similarity measure equal to the power of the largest subtree common for the trees of two compared IOs, isomorphically transformed relative to the designated temporary roots $r_1$ and $r_2$ respectively, and $\alpha$ is a numeric parameter assuming values $\alpha < -1$.

42. The method according to claim 41, wherein the metric distance principal value $\rho_{main}(T_1,T_2)=\rho(T_1,R_1,T_2,R_2)$ is defined as the value of the metric function for two untransformed trees.

43. The method according to claim 27, wherein the integral value of the metric distance between two IOs is defined as $$\rho_{int}(T_1, T_2) = \sum_{r_1 \in T_1} \sum_{r_2 \in T_2} w(rel(r_1, T_1))w(rel(r_2, T_2))\rho(T_1, r_1, T_2, r_2),$$

where rel(r,T) is the relevance function equal to the distance from the root to the r node in the T tree, and the distance is a path length measured as the number of arcs from the tree root to its r arbitrary node, and w is relevance weight indicating the significance of the node positioning in the tree structure during calculation of the degree of information similarity between two IOs.

44. The method for removing information about objects of an arbitrary application domain from the system for storage and retrieval of a plurality of information objects according to claim 1, comprising the steps of:
  a) marking an AUS to be removed, and
  b) comparing IOs of new AUSs added to said storage and search system with the IO of the AUS to be removed and, if the similarity criterion as per the metric of said IOs is met, replacing the AUS being removed with the added AUS on the logical network of said system.

45. The method according to claim 44, wherein an AUS subject to removal is physically removed from the computer system after the completion of said AUS removal from the logical storage network.

46. The method according to claim 44, wherein the AUS to be removed is archived after the completion of removal said AUS from the logical storage network and is retained in the archive of the computer system.

47. The method according to claim 44, wherein during each removal, modificating links in link lists of information objects connected with said IO.

48. The method according to claim 44, wherein the metric is information distance between two IOs, determined as a matrix of size $n_1 \times n_2$: $\{\rho(T_1,r_1,T_2,r_2)\}_{n_1,n_2}$, where $T_1$, $T_2$ are rooted trees, representing the intrinsic structure of compared IOs, $r_1$, $r_2$ are two nodes (from $T_1$ and $T_2$ respectively), designated as temporary roots, $n_1$, $n_2$ denote the number of nodes in the structures of the first and second IOs respectively; therewith $\rho(T_1,r_1,T_2,r_2)=(c(T_1,r_1,T_2,r_2))^\alpha$, where $c(T_1,r_1,T_2,r_2)$ is the similarity measure equal to the power of the largest subtree common for two compared IO trees, isomorphically transformed relative to the designated temporary roots $r_1$ and $r_2$ respectively, and $\alpha$ is a numeric parameter assuming values $\alpha<-1$.

49. The method according to claim 48, wherein the principal value of the metric distance $\rho_{main}(T_1,T_2)=\rho(T_1,R_1,T_2,R_2)$ is determined as the value of the metric function for two untransformed trees.

50. The method according to claim 44, wherein the integral value of the metric distance between two IOs is defined as $$\rho_{int}(T_1, T_2) = \sum_{r_1 \in T_1} \sum_{r_2 \in T_2} w(rel(r_1, T_1))w(rel(r_2, T_2))\rho(T_1, r_1, T_2, r_2),$$

where rel(r,T) is the relevance function equal to the distance from the root to the r node in the T tree; therewith the distance is defined as the length of path measured as the number of arcs from the tree root to its arbitrary node r, and w is the relevance weight indicating the significance of the node position in the tree structure in calculating the degree of information similarity of two IOs.

51. The method for removing information about objects of an arbitrary application domain from the system for storage and retrieval of a plurality of information objects according to claim 1, comprising the steps of:
  a) for AUS to be removed, considering all neighboring active units of storage according to logical connections and selecting one candidate AUS, which is the closest by the metric to the AUS to be removed,
  b) excluding the AUS to be removed from the logical storage network,
  c) substituting a candidate AUS for the removed AUS and assigning all logical connections of the removed AUS to the candidate AUS by modifying records in the link lists of the candidate AUS and all neighboring AUSs accordingly, and
  d) recalculating metrics for all logical links of the candidate AUS.

52. The method according to claim 51, wherein the AUS to be removed is physically removed from the computer system after completion of removal said AUS from the logical storage network.

53. The method according to claim 51, wherein the AUS to be removed is archived after the completion of removal of the AUS from the logical storage network and is retained in the archive of the computer system.

54. The method according to claim 51, wherein the metric is a metric distance between two IOs defined as a matrix of size $n_1 \times n_2$: $\{\rho(T_1,r_1,T_2,r_2)\}_{n_1,n_2}$, where $T_1$, $T_2$ are rooted trees, representing the intrinsic structure of compared IOs, $r_1$, $r_2$ are two nodes (from $T_1$ and $T_2$ respectively), designated as temporary roots, $n_1$, $n_2$ denote the number of nodes in the structures of the first and second IO respectively; therewith $\rho(T_1,r_1,T_2,r_2)=(c(T_1,r_1,T_2,r_2))^\alpha$, where $c(T_1,r_1,T_2,r_2)$ is the similarity measure equal to the power (number of nodes) of the largest subtree common for two compared IO trees, isomorphically transformed relative to the designated temporary roots $r_1$ and $r_2$ respectively, and $\alpha$ is a numeric parameter assuming values $\alpha<-1$.

55. The method according to claim 54, wherein the metric distance principal value $\rho_{main}(T_1,T_2)=\rho(T_1,R_1,T_2,R_2)$ is defined as a value of the metric function for two untransformed trees.

56. The method according to claim 51 wherein the integral value of the metric distance between two IOs is defined as $$\rho_{int}(T_1, T_2) = \sum_{r_1 \in T_1} \sum_{r_2 \in T_2} w(rel(r_1, T_1))w(rel(r_2, T_2))\rho(T_1, r_1, T_2, r_2),$$

where rel(r,T) is the relevance function equal to the root-to-r-node distance in the T tree; the distance being defined as the length of the path measured as the number of arcs from the tree root to its arbitrary node r, and w standing for the relevance weight indicating the significance of the node positioning in the tree structure in calculating information similarity between two IOs.

57. The method according to claim 28, wherein the AQO periodically updates the information embedded in it through search queries to appropriate AUSs on the logical storage network of said system.

58. The method according to claim 27, wherein the AQO is added to the logical storage network of said system or to a meta-network, every node of which is an active query object, and the AQO periodically updates the information embedded in it through search queries to appropriate AUSs on the logical storage network of said system.

59. The method according to claim 30, wherein each AQO on the meta-network has associated a plurality of information objects in the logical storage network that are relevant to the subject-matter search query to which the active query object is related.

60. The method according to claim 35, wherein partial search criteria may be single-valued and multi-valued.

* * * * *